United States Patent [19]

Tsuruta

[11] Patent Number: 5,754,230
[45] Date of Patent: May 19, 1998

[54] IMAGE PICKUP APPARATUS WITH ELECTRONIC VIEWFINDER FOR SYNTHESIZING THE SUB IMAGE TO A PORTION OF THE MAIN IMAGE

[75] Inventor: Masaaki Tsuruta, Tokyo, Japan

[73] Assignee: Sony Corporation, Tokyo, Japan

[21] Appl. No.: 535,726

[22] Filed: Sep. 28, 1995

Related U.S. Application Data

[63] Continuation of Ser. No. 252,547, Jun. 1, 1994, abandoned, which is a continuation of Ser. No. 975,611, Nov. 12, 1992, abandoned.

[30] Foreign Application Priority Data

Nov. 21, 1991 [JP] Japan ................................ 3-306053

[51] Int. Cl.⁶ ........................ H04N 5/222; H04N 5/225; H04N 9/74
[52] U.S. Cl. ...................... 348/333; 348/565; 348/358; 348/596; 348/347
[58] Field of Search ........................ 348/565, 595, 348/333, 164, 169, 588, 207, 358, 240, 239, 347, 596

[56] References Cited

U.S. PATENT DOCUMENTS

| 4,527,201 | 7/1985 | Cappels | 358/224 |
|---|---|---|---|
| 4,963,981 | 10/1990 | Todaka et al. | 358/213.13 |
| 5,005,083 | 4/1991 | Grage et al. | 348/588 |
| 5,040,067 | 8/1991 | Yamazaki | 348/565 |
| 5,043,802 | 8/1991 | Tarumizu et al. | 358/36 |
| 5,144,445 | 9/1992 | Higashitsutsumi | 358/213.11 |
| 5,161,025 | 11/1992 | Nakao | 358/224 |
| 5,187,582 | 2/1993 | Higashitsutsumi | 358/213.11 |
| 5,212,598 | 5/1993 | Kikuchi | 348/347 |

FOREIGN PATENT DOCUMENTS

| 3146552 | 7/1983 | Germany | H04N 7/18 |
|---|---|---|---|
| 0238283 | 9/1989 | Japan | H04N 5/225 |
| 1231478 | 9/1989 | Japan | H04N 5/225 |

Primary Examiner—Leo Boudreau
Assistant Examiner—Bipin Shalwala
Attorney, Agent, or Firm—Jay H. Maioli

[57] ABSTRACT

The present invention is directed to a video camera in which a field of vision can be confirmed with ease when a cameraman takes a picture. An image signal from a zoom (variable power) lens (1) is developed at an output terminal (7). A signal from a wide angle lens (8) having a field angle which is substantially equal to or larger than the largest field angle of the variable power lens is supplied to a field memory (14). A read-out clock signal from a timing generator (15) is supplied to an address counter (16) and a read-out address thus formed thereby is supplied to the field memory (14). A signal read-out from the field memory (14) and a signal from the zoom (variable power) lens (1) are supplied to a switch (17), in which they are selectively synthesized in response to a read-out position signal from the timing generator (15). Then, a signal from the switch (17) is developed at an output terminal (19) from which an image signal is supplied to a viewfinder.

4 Claims, 5 Drawing Sheets

Display Frame

IMAGE PICKUP APPARATUS WITH ELECTRONIC VIEWFINDER FOR SYNTHESIZING THE SUB IMAGE TO A PORTION OF THE MAIN IMAGE

This is a continuation of application Ser. No. 08/252,547 filed Jun. 1, 1994, now abandoned which is a continuation of application Ser. No. 07/975,611 filed Nov. 12, 1992 now abandoned.

BACKGROUND OF THE INVENTION

1. Field of the Invention

The present invention relates to an image pickup apparatus for use with commercially-available video cameras or the like.

2. Description of the Related Art

When a commercially-available video camera includes a zoom (variable power) lens, if the cameraman takes a picture in a telephoto lens mode of the zoom lens, then it frequently occurs that the cameraman cannot see what portion of a field of view is magnified. Further, when the cameraman takes a picture in the telephoto lens mode, if there is a shutter release opportunity at the portion outside the picture, then it frequently occurs that the cameraman fails to record such picture before the cameraman knows the above shutter release opportunity. Such situation tends to occur when the magnification of the zoom lens is increased more.

While the professional cameraman and those who are skilled in the handling of the video camera can confirm an object through a viewfinder with one eye while seeing the object through the other eye, the ordinary users cannot do such thing skillfully.

OBJECTS AND SUMMARY OF THE INVENTION

Therefore, it is an object of the present invention to provide an improved video camera having main imaging means and sub imaging means in which the aforesaid shortcomings and disadvantages encountered with the prior art can be eliminated.

More specifically, it is an object of the present invention to provide a video camera having main imaging means and sub imaging means in which a field of vision can be confirmed with ease.

It is another object of the present invention to provide a video camera having main imaging means and sub imaging means in which the cameraman can confirm the situation of an image when taking a picture.

As a first aspect of the present invention, there is provided a video camera having a main imaging means having a variable power lens which comprises a sub imaging means having a field angle which is substantially equal to or larger than a largest field angle of the variable power lens.

According to a second aspect of the present invention, this video camera is further comprised of a zoom position detecting means formed on the variable power lens, a calculating means for calculating a magnification of the variable power lens in response to an output from the zoom position detecting means, a picture frame generating means for generating a picture frame signal corresponding to the sub imaging means on the basis of a calculated result of the magnification, and a means for superimposing the picture frame signal upon an image output from the sub imaging means.

BRIEF DESCRIPTION OF THE DRAWINGS

A better understanding of other objects, features, and advantages of the present invention can be gained from a consideration of the following detailed description of illustrative embodiments thereof, in conjunction with the figures of the accompanying drawings, wherein.

DETAILED DESCRIPTION OF THE PREFERRED EMBODIMENTS

The present invention will now be described with reference to the drawings.

Figure 1:
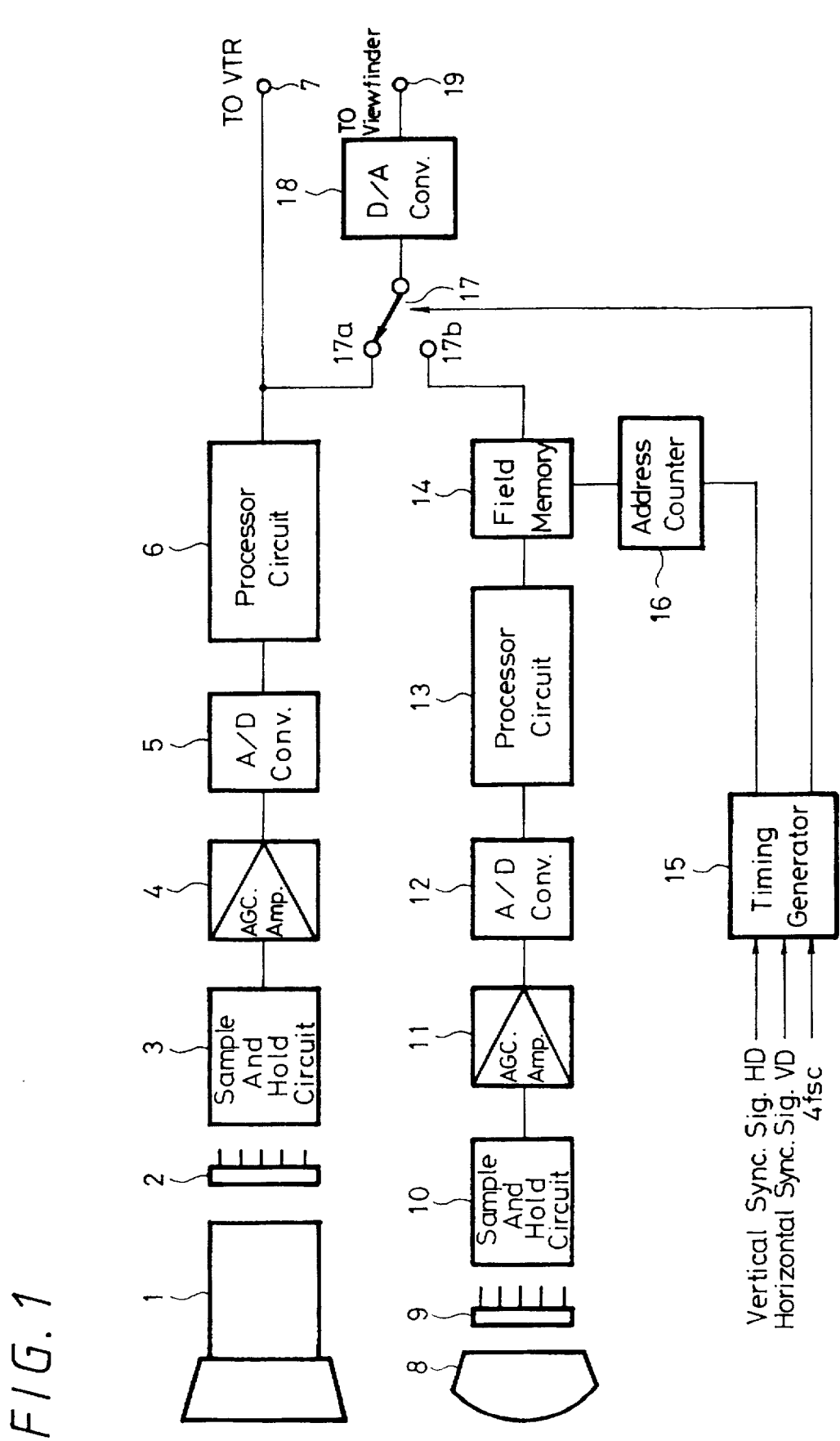
FIG. 1 is a block diagram showing an arrangement of an image pickup apparatus according to an embodiment of the present invention.

FIG. 1 of the accompanying drawings shows in block form an arrangement of an image pickup apparatus according to a first embodiment of the present invention.

As shown in FIG. 1, there is provided a zoom (variable power) lens 1 which constructs a main imaging means. A light of a video image from the zoom lens 1 is irradiated on a charge-coupled device (CCD) 2. An image signal from the CCD 2 is supplied through a sample and hold circuit 3 to an automatic gain control (AGC) amplifier 4. A signal from the AGC amplifier 4 is supplied through an analog-to-digital (A/D) converter circuit 5 to a processor circuit 6. The signal thus processed is supplied to an output terminal 7 from which an image signal is delivered to a video tape recorder (not shown).

On the other hand, there is shown a wide angle lens 8 whose field angle is substantially equal to or larger than a largest field angle of the variable power lens 1. A light of a video image from the lens 8 is irradiated on a CCD 9. An image signal from the CCD 9 is supplied through a sample and hold circuit 10 to an AGC amplifier 11. A signal from the AGC amplifier 11 is supplied through an A/D converter circuit 12 to a processor circuit 13. The signal thus processed is supplied to a field memory 14.

There is shown a timing generator 15 which generates a predetermined read clock signal and a predetermined read-out position signal in response to a vertical sync. (synchronizing) signal VD, a horizontal sync. signal HD and a signal having a frequency of 4 fsc supplied thereto. The read clock signal is supplied to an address counter 16 and the thus formed read-out address is supplied to the field memory 14.

The signal read-out from the field memory 14 and the signal from the processor circuit 6 are supplied to a switch 17, in which they are selectively synthesized in response to the read-out position signal from the timing generator 15. A signal from the switch 17 is supplied through a digital-to-analog (D/A) converter circuit 18 to an output terminal 19 from which an image signal is supplied to a viewfinder (not shown).

Figure 2:
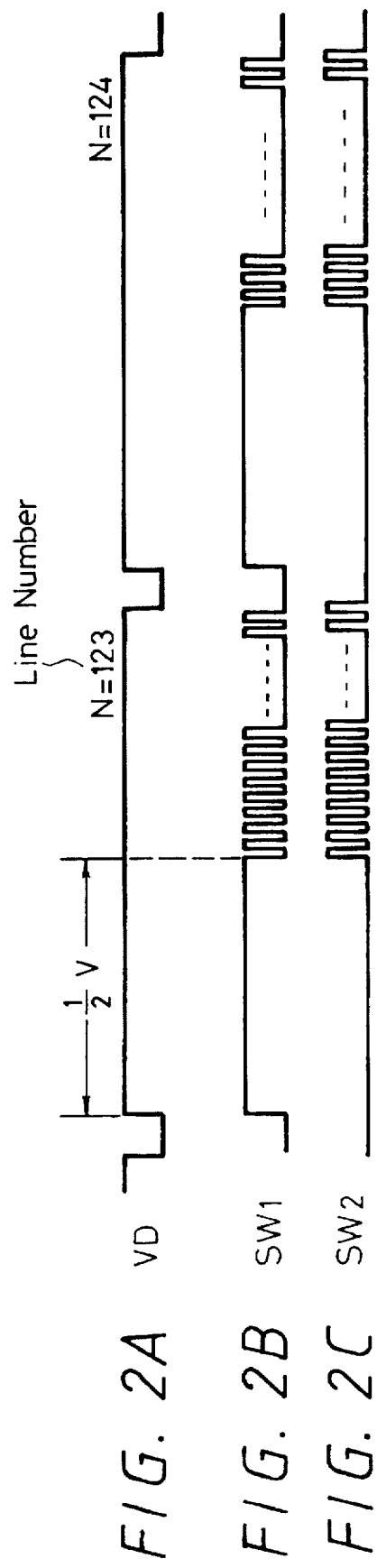
FIGS. 2A through 2C are respectively timing charts used to explain the imaging apparatus shown in FIG. 1.

FIGS. 2A to 2C of the accompanying drawings show timing charts of signals which are generated from the timing generator 15. As shown in FIGS. 2A to 2C, read-out position signals SW1, SW2 (see FIGS. 2B, 2C), which are used to connect the switch 17 to its fixed contact 17a or 17b, are generated in response to a vertical sync. signal VD shown in FIG. 2A. FIGS. 3A through 3D of the accompanying drawings show a portion which follows a V/2 period shown in FIG. 2A. Read-out position signals SW1, SW2 (see FIGS. 3B, 3C), which are used to switch the switch 17, are generated in response to the horizontal sync. signal HD shown in FIG. 3A.

Figure 3:
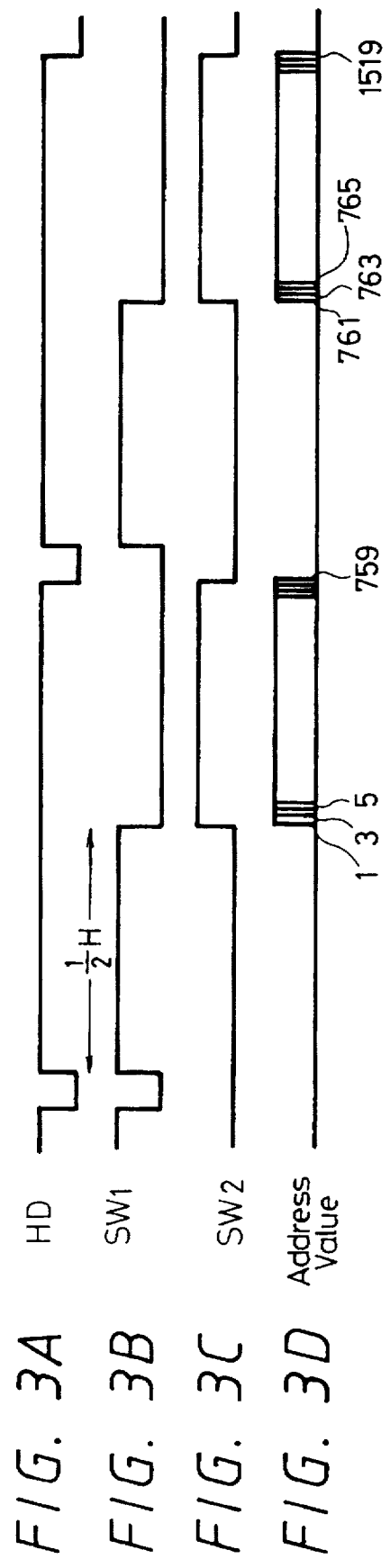
FIGS. 3A through 3D are respectively timing charts used to explain the imaging apparatus shown in FIG. 1.
Figure 4:
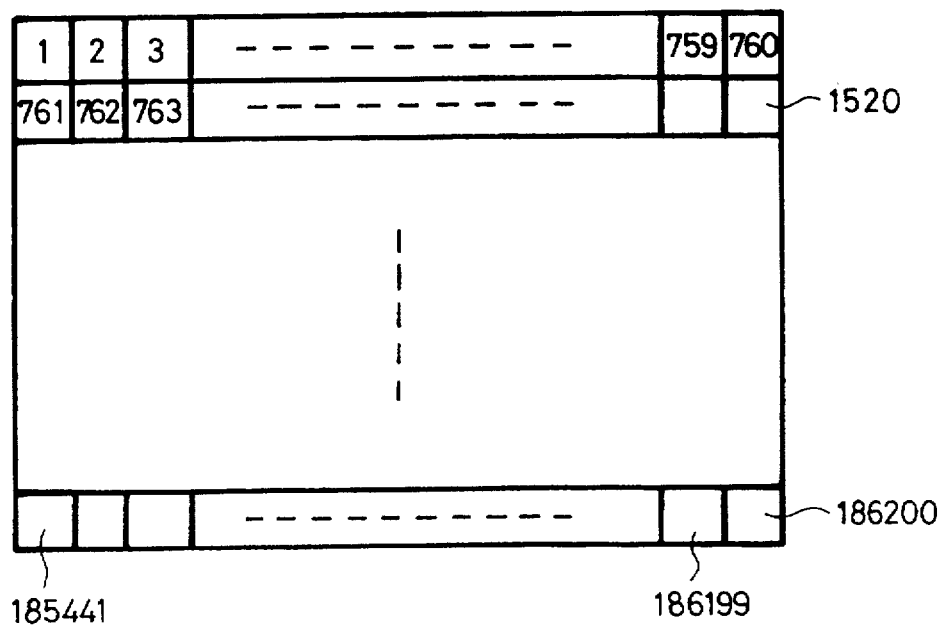
FIG. 4 is a diagram showing an address of a field memory used in the present invention.

Further, during the switch 17 is switched to the fixed contact 17b, the timing generator 15 generates a read-out clock signal shown in FIG. 3D on the basis of the signal having the frequency of 4 fsc. This read-out clock signal is supplied to the address counter 16 which forms read-out addresses whose address values are illustrated in FIG. 3D. The field memory 14 has a storage capacity of 760 in the horizontal direction and 245 in the vertical direction. FIG. 4 of the accompanying drawings shows an address arrangement thereof.

Figure 5:
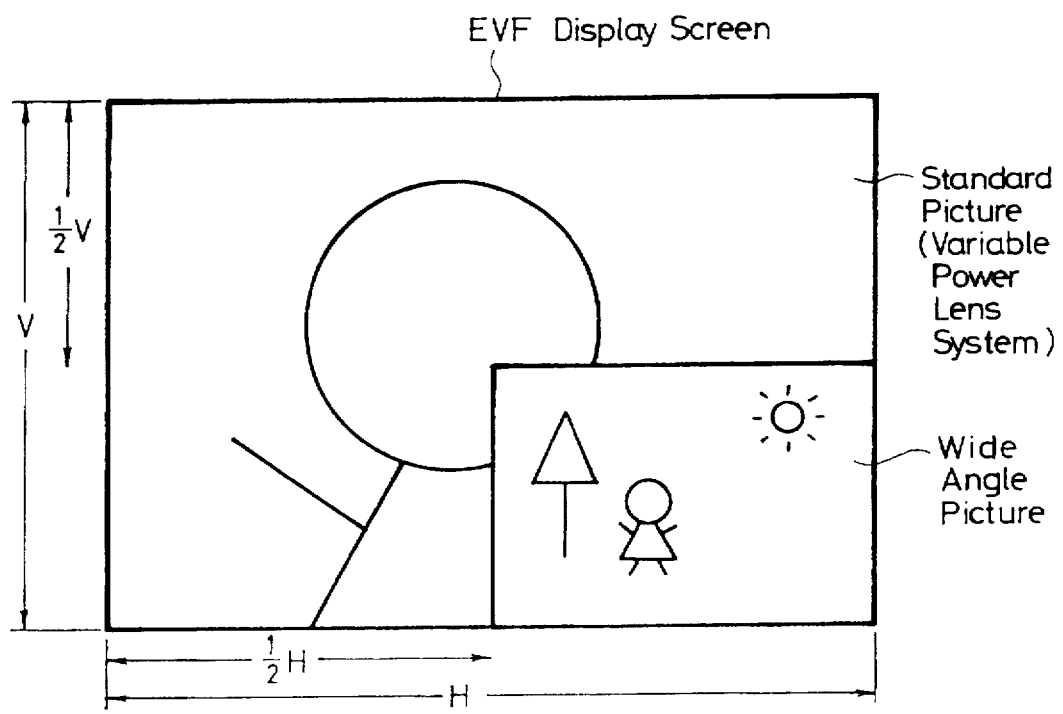
FIG. 5 is a pictorial representation showing an example of a displayed image.

Therefore, a viewfinder image signal developed at the output terminal 19 is formed as an image signal shown in FIG. 5 of the accompanying drawings. As shown in FIG. 5, an image picked-up by means of the wide angle lens 8 is displayed on a quarter of the picture screen at its lower right position so that the cameraman can confirm both the picked-up image by the wide angle lens 8 and the field of vision by the zoom lens 1 at the same time.

As described above, according to the above-mentioned apparatus, since the cameraman can see the image of the sub imaging means (CCD 9 to processor circuit 13) having the wide field angle (lens 8), the user can confirm the field of vision with ease.

Figure 6:
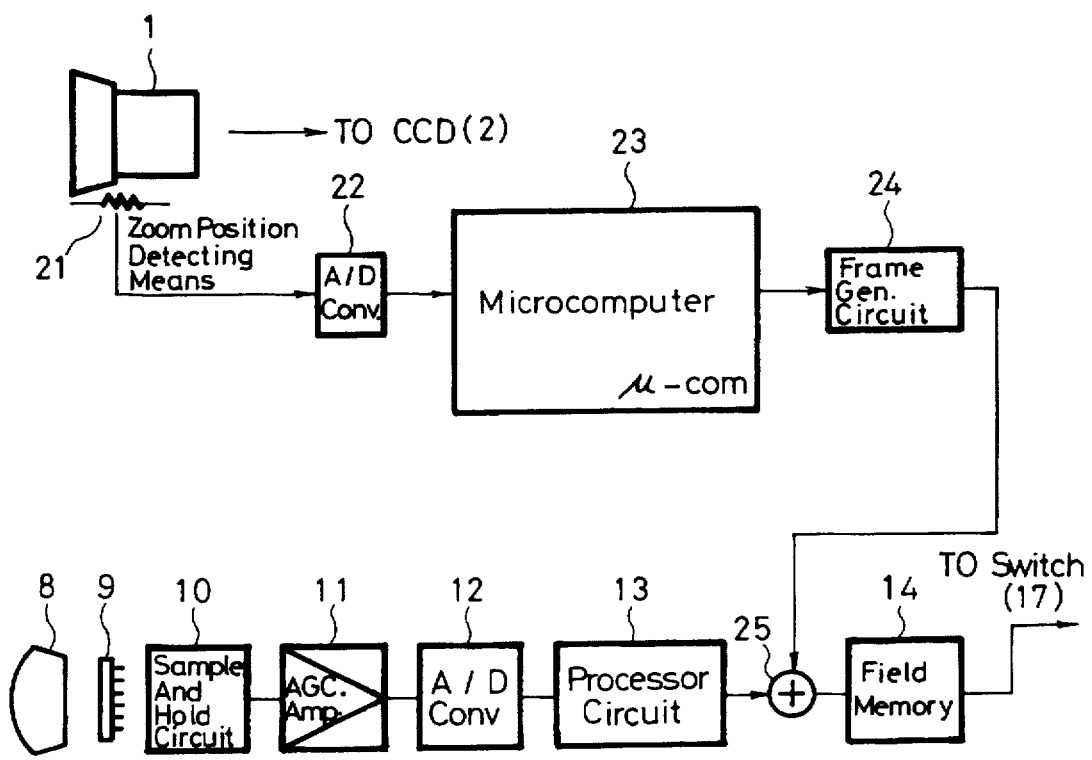
FIG. 6 is a block diagram showing a main portion of the image pickup apparatus according to another embodiment of the present invention.

FIG. 6 of the accompanying drawings shows the image pickup apparatus according to another embodiment of the present invention.

As shown in FIG. 6, there is provided a detecting means 21 that detects the zoom position of the zoom (variable power) lens 1. A detected signal from the detecting means 21 is supplied through an A/D converter circuit 22 to a microcomputer 23 which calculates the magnification of the zoom lens 1 at that position from data representative of the zoom position. A signal representative of the magnification thus calculated by the microcomputer 23 is supplied to a frame signal generator circuit 24, from which there is derived a predetermined display frame signal. This display frame signal is supplied to an adder circuit 25, in which it is added to the signal supplied from the processor circuit 13 before being supplied to the field memory 14.

Figure 7:
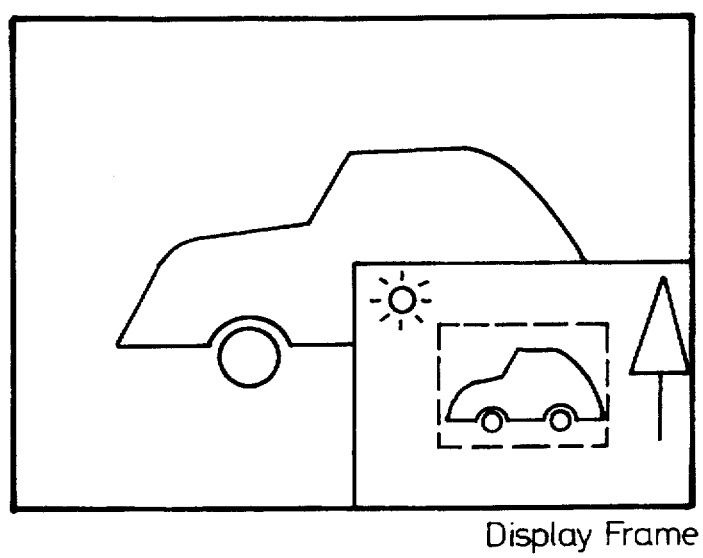
FIG. 7 is a pictorial representation showing an example of a displayed image according to another embodiment of the present invention.

FIG. 7 of the accompanying drawings shows an example of the viewfinder image signal based on the signal that is developed at the output terminal 19 similarly to FIG. 5. As shown in FIG. 7, a frame representative of the field angle of the image picked-up by the zoom lens 1 is displayed within the image picked-up by the wide angle lens 8. Therefore, the cameraman can confirm the situation of the picture picked-up more satisfactorily.

As described above, according to the present invention, since the cameraman can see the image picked up by the sub imaging means having the wide field angle, the cameraman can confirm the field of vision with ease.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A video camera having an electronic viewfinder, comprising:

main imaging means including a variable power lens for producing an electronic signal representing a main image;

sub imaging means having a field angle which is substantially equal to or larger than a largest field angle of the variable power lens for producing an electronic signal representing a sub image;

means for selectively supplying the main image signal and the sub image signal to the electronic viewfinder for synthesizing the sub image to a predetermined portion of the main image;

zoom position detecting means formed on the variable power lens;

calculating means for calculating a magnification of the variable power lens in response to an output from the zoom position detecting means;

picture frame generating means for generating on the sub image a picture frame signal corresponding to the main image on the basis of a calculated magnification;

means for superimposing the picture frame signal upon the sub image to indicate an area on the sub image corresponding to the main image; and means for synthesizing the sub image superimposed with the picture frame on the predetermined portion of the main image.

2. The video camera according to claim 1, wherein the calculating means is a microcomputer.

3. The video camera according to claims 1 or 2, wherein the main image is supplied to recording means and the sub image is supplied to the electronic viewfinder.

4. A video camera having an electronic viewfinder, comprising:

a variable power lens forming a main imaging means for an address counter for receiving the timing output from the timing generator and producing a read-out address;

a field memory for receiving the intermediary image signal from the second processor circuit and the read-out address from the address counter and producing a sub image signal;

a switch for receiving the main image signal from the first processor circuit, the sub image signal from the field memory, and the timing output from the timing generator and synthesizing a response signal;

a digital-to-analog converter for receiving the response signal from the switch and outputting a final image signal to the electronic viewfinder of the video camera, wherein the video object imaged by the variable power lens is displayed as a primary image on the electronic viewfinder and the video view imaged by the wide angle lens is displayed as a secondary image within the primary image so that a user of the video camera may observe both the primary image and the secondary image simultaneously;

detecting means for detecting a zoom position of the variable power lens and outputting a detected signal;

a microcomputer for converting the detected signal to a zoom position magnification and outputting a magnification signal; and a frame signal generator circuit for receiving the magnification signal and producing a display frame signal to imaging a video object;

a first charge-coupled device for receiving light from the video object imaged by the variable power lens and producing a first image signal;

a first processor circuit, including a first sample-and-hold circuit, a first automatic gain control amplifier, and a first analog-to-digital converter, for processing the first image signal from the first charge-coupled device and outputting a main image signal;

a wide angle lens having a field angle substantially equal to or larger than the largest field angle of the variable power lens, the wide angle lens forming a sub imaging means for imaging a video view that includes the video object imaged by the variable power lens;

a second charge-coupled device for receiving light from the video view imaged by the wide angle lens and producing a second image signal;

a second processor circuit, including a second sample-and-hold circuit, a second automatic gain control amplifier, and a second analog-to-digital converter, for processing the second image signal from the second charge-coupled device and outputting an intermediary image signal;

a timing generator for generating a timing output, including a predetermined clock signal and a predetermined position signal, in response to a vertical synchronizing signal, a horizontal synchronizing signal, and a signal of predetermined frequency supplied thereto; to be added to the intermediary signal from the second processor circuit, wherein a display frame is produced on the electronic viewfinder framing a portion of the video view of the secondary image showing the video object that is magnified by the variable power lens and displayed as the primary image on the electronic viewfinder.

* * * * *